United States Patent [19]
Boehm et al.

[11] Patent Number: 5,005,465
[45] Date of Patent: Apr. 9, 1991

[54] BRAKE BOOSTER

[75] Inventors: Peter Boehm, Friedrichsdorf; Raif Jakobi, Liederbach; Jurgen Bauer, Wiesbaden, all of Fed. Rep. of Germany

[73] Assignee: Alfred Teves GmbH, Frankfurt Am Main, Fed. Rep. of Germany

[21] Appl. No.: 313,922

[22] Filed: Feb. 22, 1989

[30] Foreign Application Priority Data

Feb. 29, 1988 [DE] Fed. Rep. of Germany ....... 3806401

[51] Int. Cl.⁵ ............................................... F15B 9/10
[52] U.S. Cl. .................................. 91/369.1; 91/376 R
[58] Field of Search ................. 91/369.1, 369.2, 369.3, 91/376 R; 60/547.1

[56] References Cited

U.S. PATENT DOCUMENTS 4,283,911 8/1981 Makamura et al. ................. 60/547.1
4,854,220 8/1989 Imayoshi ............................ 91/369.1

FOREIGN PATENT DOCUMENTS 1173256 12/1969 United Kingdom .
1593079 7/1981 United Kingdom .

Primary Examiner—Edward K. Look
Attorney, Agent, or Firm—Robert P. Seitter; J. Gordon Lewis

[57] ABSTRACT

In order to enable a brake booster to operate both with a pressure above atmospheric and with atmospheric pressure without any negative mutual influences of the two energy types and without any change in the responding behavior of the device in case of failure of either energy type, the invention provides a pneumatic system which, during the operation of the brake booster with pressure above atmospheric, causes a force constituent to become active so as to counteract the forces caused by the increased pressure difference and acting on the control valve piston as well as on the control valve housing.

14 Claims, 2 Drawing Sheets

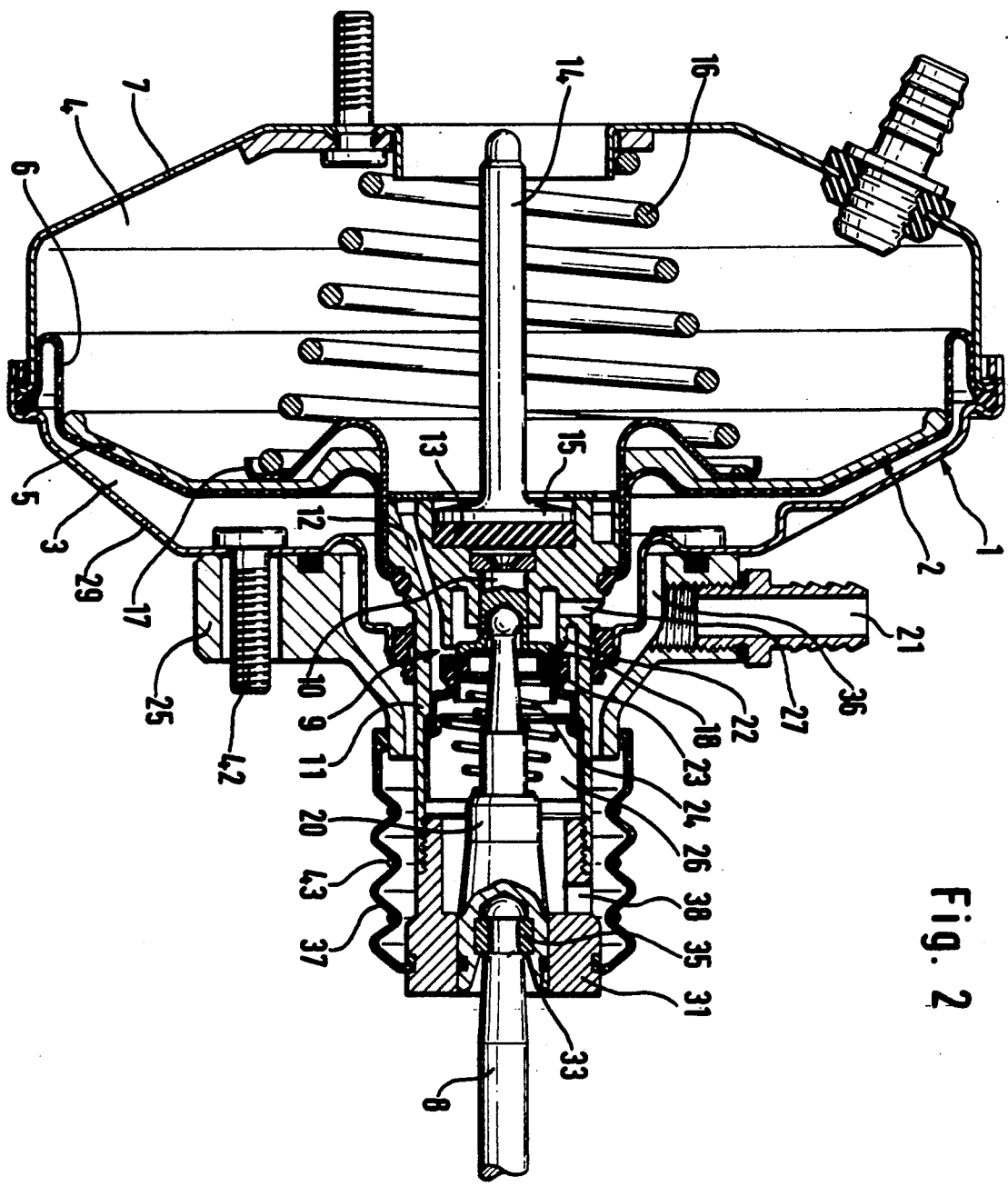

BRAKE BOOSTER

BACKGROUND OF THE INVENTION

This invention relates to a brake booster with a booster housing subdivided by means of a movable wall arranged therein into a chamber of constant pressure (vacuum chamber) and into a working chamber, with the movable wall being formed by a diaphragm disk and by a rolling diaphragm partially abutting the diaphragm disk, with a piston rod—coupled with a brake pedal—for actuating a control valve, which alternatively connects the working chamber with a vacuum or with a higher differential pressure wherein the control valve includes a control valve piston, axially displaceable in a control valve housing, acting on the end of a push rod through a reaction element.

A brake booster of this type has been disclosed in German Patent Specification (DE-PS) No. 29 25 550.

The particular feature about this type of brake booster is that a stop is provided at its control valve housing, which limits the initial advancing movement of the movable wall relative to the control valve housing. The stop is distanced axially at a predetermined distance with respect to the corresponding part of the movable wall when the movable wall and the control valve housing are in their respective rest positions. The movable wall is axially displaceable out of its rest position until it becomes engaged with the stop of the control valve housing, without exerting any force on the control valve housing which would carry the control valve housing along in the advancing direction. In the case of a small initial input stroke, the brake booster will have a predeterminable larger output stroke and, subsequently, an output stroke proportional to the input stroke.

The brake booster disclosed in the abovementioned patent specification also includes a power booster using a pressure source for generating a pressure difference acting on the movable wall. However, what is to be considered disadvantageous is the necessity of separating the chamber of constant pressure (vacuum chamber) from the existing vacuum source and of exposing it to the surrounding atmosphere since, in case of an excessive pressure difference, there will exist the danger of an undesired self-operation of the power booster which would result in an uncontrollable braking operation. This, however, means that there will be no boosting energy available in the case of a failure of the pressure source.

SUMMARY OF THE INVENTION

It is therefore an object of the present invention to avoid this serious disadvantage and to suggest a brake booster of the abovementioned type working both with pressure above atmospheric and with atmospheric pressure without any negative mutual influences of the two energy types and without any change in the responding behavior of the device in the case of a failure of either energy type.

According to this invention, pneumatic means are provided which, during the operation of the brake booster with pressure above atmospheric, cause a force to become active in order to counteract the forces caused by the increased pressure difference acting on the control valve piston and on the control valve housing. As a result of this configuration of the invention, all brake booster types can be reset by means of slight modifications to become a charged device.

The pneumatic means are formed by a compensating piston connected with the control valve housing and by an active surface communicating with the control valve piston, wherein the piston and the surface can be applied by the differential pressure.

An especially compact embodiment of the invention has the active surface formed at the piston rod actuating the control valve piston and sealingly guided within the compensating piston.

In another embodiment of this invention the active surface is formed at the end of an intermediate rod, which is averted from the control valve piston. The intermediate rod is sealingly guided in the compensating piston and actively communicates with the piston rod. The piston rod is supported in the intermediate rod by means of an elastic piston rod holder. Consequently, the movability of the piston rod is not affected unduly by being guided within the compensating piston.

An especially compact embodiment of the invention has a flange at the booster housing, which is equipped with a differential pressure connection and, together with the booster housing as well as the control valve housing, confines a differential pressure chamber.

Considerable relief of the compression spring resetting the movable wall is achieved in that, upstream of the compensating piston in the actuating direction, a pneumatic pressure chamber is arranged which communicates with the working chamber of the brake booster.

BRIEF DESCRIPTION OF THE DRAWINGS

In the following text, the invention will be explained in more detail, reference being made to two embodiments of the invention, wherein like parts are assigned like reference numerals and in the drawings:

FIG. 2 is a longitudinal section through another embodiment of the brake booster.

DETAILED DESCRIPTION OF THE PREFERRED EMBODIMENTS

Figure 1:
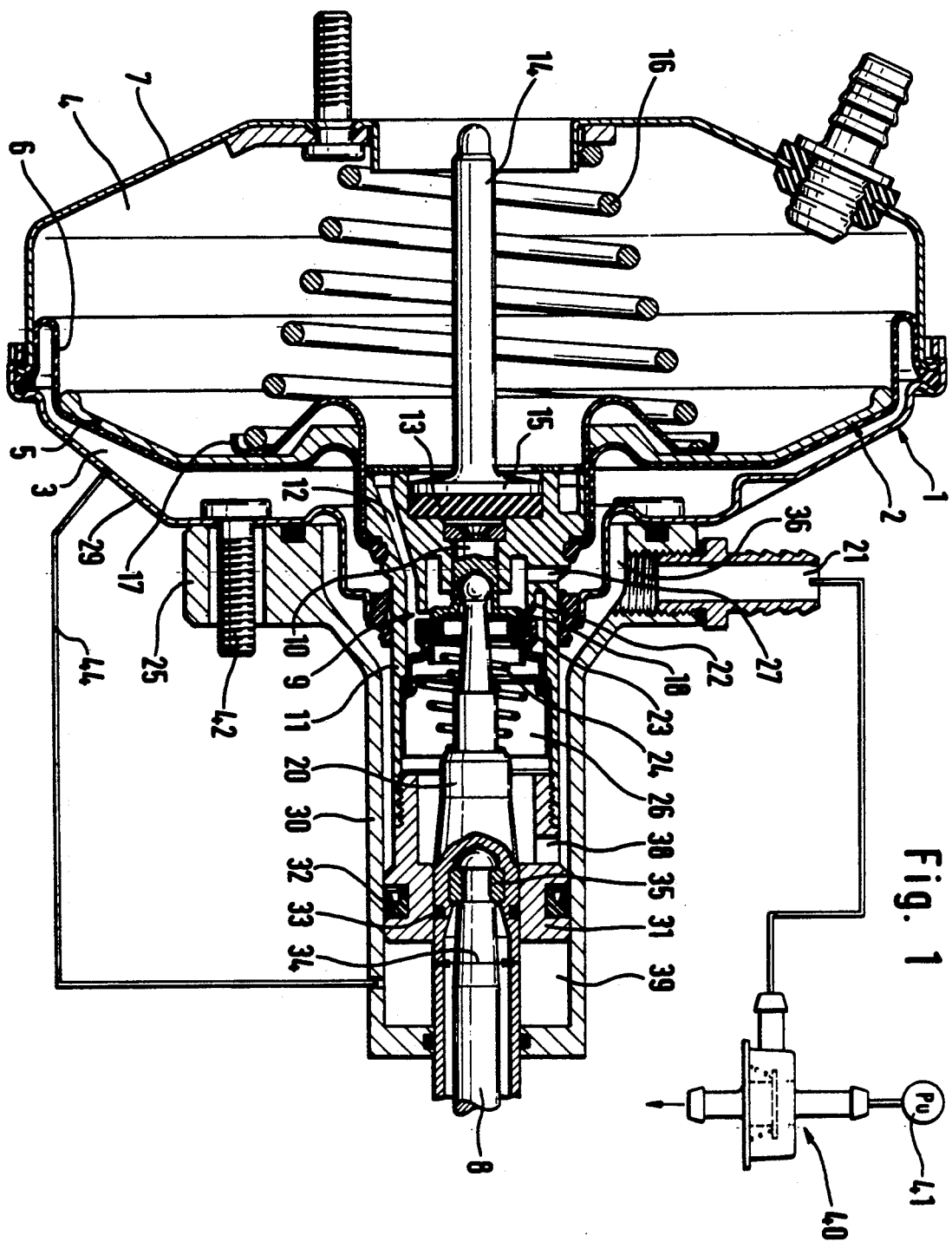
FIG. 1 is a longitudinal section through a brake booster according to the invention.

The brake booster according to FIGS. 1 and 2 has a booster housing 1 subdivided into a working chamber 3 and into a vacuum chamber 4 by means of an axially movable wall 2. The axially movable wall 2 consists of a deep-drawn sheet-metal diaphragm disk 5 and a flexible diaphragm 6 abutting thereon. Between the outer circumference of the diaphragm disk 5 and the vacuum housing 1, in a manner not illustrated in more detail, the diaphragm 6 forms a rolling diaphragm acting as a seal.

A control valve 9, which is actuable by a piston rod 8 through the intermediary of an intermediate rod 20, has a control valve piston 10 connected with the intermediate rod 20. The control valve piston 10 releases valve openings in a control valve housing 11 so that, in the illustrated non-actuated position, the working chamber 3 communicates with the vacuum chamber 4 via air guide channels 12 extending laterally in the control valve housing 11 and ending on the front side at the periphery of the control valve housing 11. Upon an actuation of the control valve 9, i.e., upon an axial displacement of the piston rod 8, communication from the vacuum chamber 4 to the working chamber 3 will be interrupted; the working chamber 3 will be connected with the atmosphere so that the movable wall 2 will move towards the vacuum chamber 4.

Via a rubber-elastic reaction disk 13 received in a front-side recess of the control valve housing 11 and via a push-rod 14 having a flange 15, the braking force will be transmitted onto an actuating piston of a (non-illustrated) master cylinder of the brake system, which master cylinder is arranged on the vacuum-side end of the brake booster.

A compression spring 16 supporting itself on the vacuum-side front wall 7 of the booster housing 1 and on a flange 17 will keep the movable wall 2 in the illustrated initial position.

On the pedal-side front wall 29 of the booster housing 1, a flange 25 is fastened by means of the fastening elements 42 mounting the brake booster to the splash wall of an automotive vehicle. The flange 25 has a differential pressure connection 21 connectible to a pressure source 41 or to the surrounding atmosphere via a valve marked 40. Together with the booster housing 1, or rather its pedal-side front wall 29, as well as with the control valve housing 11, the flange 25 which preferably has an axial extension 30 confines a differential pressure chamber 36.

A compensating piston 31 connected with the control valve housing 11, preferably by way of screwing, is sealingly guided in the axial extension 30 of the flange 25. The compensating piston 31 has a radial passage 38 connecting the differential pressure chamber 36 with the inside of the control valve housing 11. A gasket 32 sliding along the wall of the axial extension 30 takes care of sealing the compensating piston 31. The compensating piston 31 has an axial bore wherein the abovementioned intermediate rod 20 is sealingly guided by means of an O-ring 33 while forming an active surface 34 which is the exposed portion of the intermediate rod 20 in the chamber 26. At the end of the axial extension 30, a pressure chamber 39 is provided which, in the actuating direction, is arranged upstream of the compensating piston 31. For the purpose of relieving the compression spring 16, the pressure chamber 39 communicates with the working chamber 3 by means of a pneumatic connection 44. The piston rod 8 is supported in the intermediate rod 20 by means of an elastic piston rod holder 35. The arrangement of the compensating piston 31 and the active surface 34 eliminates the action of axial forces in the rest position since a pressure difference between the pressure in excess of atmospheric pressure in the chamber 26 and the outside atmosphere is applied to the active surface 34 of the intermediate rod 20 thereby creating a force component which is directed to the right in FIG. 1 and compensates for a force which is generated by the pressure difference between the chamber 26 and the vacuum chamber 4 acting on the element 18 and, thus, on the intermediate rod 20. The axial forces, due to the increased pressure of the supplied air, would seek to displace the control valve housing 11, as well as the control valve piston 10, in the actuating direction.

Upon actuation of the brake pedal the piston rod 8, or rather the intermediate rod 20, will be displaced with the valve piston 10 to the left contrary to the force of a spring 24. In this action, the spring 24 will push a poppet valve 23 to the left onto a sealing seat 22 in the control valve housing 11 and the air guide channel 12 will be closed. In the further course of the movement, the seat 18 on the valve piston 10 will move away from the poppet valve 23. An outside air passage 26 formed inside the control valve housing 11 will be opened. Now, the way is open for the air supplied from the pressure source 41 or for the atmospheric air to reach the right side of the valve piston 10 through the outside air passage 26 in the control valve housing 11, whereby the vacuum in the working chamber 3 will be removed via an air channel 27 formed in the control valve housing 11. The force forming due to the pressure difference now prevailing on the right and left sides of the movable wall 2 will displace the same against the force of the compression spring 16 to the left and will do so likewise with the push rod 14 and the piston in the master cylinder. The pressure building up in the master cylinder, after the primary seal will have overridden the compensating bore, will exert a reaction force on the reaction disk 13 via the piston and the push rod 14 in correspondence with the transmission ratio. The reaction pressure will likewise be transmitted onto the valve piston 10 whereby the same will be displaced to the right and will sealingly seat itself with its seat 18 on the poppet valve 23. With that, air guide channel 12 and outside air passage 26 will be closed. The valve piston 10 will thus have adopted its so-called ready position.

Upon full brake application, the outside air passage 26 will be opened permanently, whereby at the movable wall 2 there will result the pressure difference achievable at the maximum and, thus, the maximum boosting pressure. Thus, the full control pressure of the device will have been reached. Now, an even greater pressure in the master cylinder can be reached only by the additional force on the piston rod 8 by means of the driver's foot pressure. The brake pedal being taken back completely, the control valve piston 10 will return into its initial position, with the outside air passage 26 closing and the vacuum passage 12, 27 being permanently open. Due to the automatically resulting vacuum compensation at the movable wall 2 in which vacuum is applied on the right side of the movable wall 2, as viewed in FIG. 1, and in the pressure chamber 39 through pneumatic connection 44 and pressure in excess of atmospheric pressure prevails in chamber 26, a net force results acting to the right on the compensating piston 31 in the same direction as the resulting force of the spring 16. Thus, there will no longer be any force acting on the movable wall 2 and the resetting force of the spring arranged in the brake booster housing 1 will be sufficient to return the movable wall 2 into its released position and relieve the spring 16. Thus, also the piston of the master cylinder will move back into its released position.

In the embodiment of the invention shown in FIG. 2, the compensating piston 31 is sealed by means of a bellows 37 fastened thereto, the other end of the bellows 37 being directly fastened to the flange 25. The differential pressure chamber 36 of this embodiment is partially confined by the wall of the bellows 37 provided with reinforcing rings 43.

While certain embodiments of the invention have been described in detail above, it will be apparent to those skilled in the art that the disclosed embodiment may be modified. Therefore, the foregoing description is to be considered exemplary rather than limiting, and the true scope of the invention is that defined in the following claims.

What is claimed is:

1. A brake booster comprising a booster housing subdivided by means of a movable wall arranged therein into a chamber of constant pressure and into a working chamber, the movable wall being formed by a diaphragm disk and by a rolling diaphragm partially abutting the diaphragm disk, a piston rod coupled with a brake pedal for actuating a control valve to alternatively connect the working chamber with a vacuum or with a higher differential pressure, the control valve having a control valve piston axially displaceable in a control valve housing and acting on an end of a push rod through an intermediary of a reaction element, pneumatic means for activating, during the operation of the brake booster with pressure above atmospheric, a force constituent to counteract forces caused by an increased pressure difference and acting on the control valve piston as well as on the control valve housing.

2. The brake booster as claimed in claim 1, wherein the pneumatic means are formed by a compensating piston connected with the control valve housing and by an active surface on the piston communicating with the control valve piston, such that the increased pressure difference is applied to the piston and the surface.

3. The brake booster as claimed in claim 2, wherein the compensating piston is screwed together with the control valve housing.

4. The brake booster as claimed in claim 2, wherein the active surface is formed at the piston rod actuating the control valve piston and sealingly guided within the compensating piston.

5. The brake booster as claimed in claim 2, wherein the active surface is formed at an end of an intermediate rod, the end being averted from the control valve piston and the intermediate rod being sealingly guided in the compensating piston and actively communicating with the piston rod.

6. The brake booster as claimed in claim 5, wherein the piston rod is supported in the intermediate rod by means of an elastic piston rod holder.

7. The brake booster as claimed in claim 1, further comprising a flange connected to the booster housing equipped with a differential pressure connection and, together with the booster housing as well as the control valve housing, confining a differential pressure chamber.

8. The brake booster as claimed in claim 7, wherein the compensating piston is sealed relative to the flange by means of a radially reinforced bellows.

9. The brake booster as claimed in claim 7, further comprising the flange having an axial tubular extension and the compensating piston sealingly guided within the axial tubular extension.

10. The brake booster as claimed in claim 9, wherein the differential pressure chamber extends into the area between the extension and the control valve housing.

11. The brake booster as claimed in claim 9, wherein the compensating piston is sealed relative to the extension by means of a gasket.

12. A brake booster as claimed in claim 7, further comprising a valve connected to the differential pressure connection to alternatively connect the differential pressure connection with a pressure source or the surrounding atmosphere in dependence on the level of the supplied differential pressure.

13. A brake booster as claimed in claim 9 wherein, upstream of the compensating piston in the actuating direction, a pneumatic pressure chamber is arranged to communicate with the working chamber of the brake booster.

14. A brake booster as claimed in claim 9 wherein, the compensating piston has a radial passage connecting the differential pressure chamber with the inside of the control valve housing.

* * * * *